United States Patent

[11] 3,619,024

| [72] | Inventor | Joseph Ralph Frattarola<br>Hightstown, N.J. |
|---|---|---|
| [21] | Appl. No. | 861,675 |
| [22] | Filed | Sept. 29, 1969 |
| [45] | Patented | Nov. 9, 1971 |
| [73] | Assignee | RCA Corporation |

[54] PACKING OF HOLOTAPE
1 Claim, 7 Drawing Figs.

[52] U.S. Cl............ 350/3.5,
204/4, 264/1, 352/238
[51] Int. Cl............ G02b 5/00,
G03c 1/76
[50] Field of Search............ 350/3.5;
352/85, 238; 96/78, 27 H; 264/1, 284; 204/4–6

[56] References Cited
UNITED STATES PATENTS
| 1,659,909 | 2/1928 | De Forest | 352/238 |
| 3,265,776 | 8/1966 | Henkes | 264/1 |

FOREIGN PATENTS
| 1,139,955 | 1/1969 | Great Britain | 350/3.5 |

Primary Examiner—David Schonberg
Assistant Examiner—Ronald J. Stern
Attorney—Glenn H. Bruestle ABSTRACT: A hologram in the form of a flexible tape, either metal or plastic, has a central region of a first thickness and having a hologram relief pattern thereon and edge regions of a greater thickness so as to provide protective ridges for the relief pattern when wound upon itself. A method of making such a hologram includes, placing a hologram original on a backing material wider than the original, metallizing the exposed surfaces of the original and backing layer, separating the metallized layer from the original and backing to form a master, embossing the hologram from the master into a plastic tape having a width greater than that of the master.

PATENTED NOV 9 1971                      3,619,024

INVENTOR.
Joseph R. Frattarola
BY
ATTORNEY

PACKING OF HOLOTAPE

BACKGROUND OF THE INVENTION

This invention relates to holograms and more particularly to hologram replicas in the form of a flexible tape capable of being stored on a reel and useful for the storage, playback and display of information and a method of making said replicas.

A hologram is a recording in the form of an interference fringe pattern of all the information in a wave front of light obtained from an object which is illuminated with spatially monochromatic light. An image of the original object can be reconstructed from the hologram by illuminating the hologram with spatially coherent monochromatic light. The information stored in the form of a hologram need not be limited to the interference fringes of real objects, but may also be in the form of coded information. A detailed description of holography appears in the article, "Photography by Laser" by Emit N. Leith and Juris Upatnicks appearing on page 24 of the June, 1965 issue of Scientific America.

One form of hologram is manifested by variations in the opacity of a material which forms the holographic interference pattern. Another form of hologram is manifested by variations in thickness such that the interference pattern exists as a relief pattern made of profile contours. The relative position and the relative magnitude of the relief pattern determines the holographic information. This type of hologram is termed a phase hologram because reconstruction of the holographic information occurs due to phase delays related to the profile contours of the relief pattern.

I have perfected a method of replicating phase holograms in the form of a flexible plastic tape capable of being stored on a reel. This method is the subject of my separate patent application entitled "HOLOGRAPHIC REPLICAS AND METHOD OF MANUFACTURE THEREOF" and filed concurrently herewith. Such tape is particularly useful for the storage, playback and display of video information and may provide a mass produced, inexpensive medium which will enable the public to purchase home movies, broadway shows, television shows, educational material and the like which can be played back through their own television set with the proper apparatus attached thereto or which may be displayed on a screen.

In order that replicated phase holograms in the form of a flexible tape, hereinafter termed a Holotape replica be useful for recording video information they must have extremely high resolution and the depth and configuration of the relief pattern must be maintained with repeated use. The terminology Holotape replica as used herein is meant to include a hologram master which is generally a flexible metal tape as well as the final plastic flexible tape produced therefrom. The peak-to-valley depths of the contours comprising the relief pattern are only in the order of about 500A. Consequently, it can be seen that practically no wear to the hologram surface is tolerable. However, if Holotape replicas are to be wound upon itself on a reel for storage there will be a certain amount of wear due to abrasion of the back surface of the Holotape replica with the front surface of the Holotape replica upon which the relief pattern lies. This invention describes a Holotape which prevents this abrasion.

SUMMARY OF THE INVENTION

A flexible tape capable of being wound on a reel has a central portion containing a hologram relief pattern and raised edge portions adjacent the central portion.

The raised edges or ridges provide contact surfaces for the tape when reeled such that there is no contact to the holographic relief pattern. The invention includes both Holotape masters and Holotape replicas.

A novel method for producing a plastic Holotape replica and a Holotape master as described above is set forth. This novel method includes the step of forming a metal master by centering a hologram original over a backing strip having a width greater than the original and then plating a metal on the surface of the hologram original and backing strip to form a flexible master. The metal master thus formed is separate from the original and backing strip. The replica is then formed by embossing the relief pattern from the master onto a flexible thermoplastic tape. The master is centered over the wider tape during embossing.

DETAILED DESCRIPTION OF THE INVENTION

Figure 1:
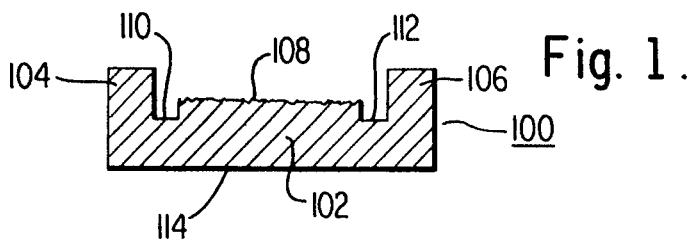
FIG. 1 is a cross-sectional, elevational view of a preferred embodiment of a novel plastic Holotape replica.

FIG. 1 shows a preferred Holotape replica comprising a flexible thermoplastic tape 100 having a central region 102 and thickened edge regions providing ridges 104 and 106 adjacent thereto. On one surface of the central region 102 of the Holotape replica is a holographic relief pattern 108. The ridges 104 and 106 of the Holotape replica are on the same side of the tape as the relief pattern 108, and are raised with respect to the relief pattern 108, so as to provide protection therefor. Grooves 110 and 112 separate the central region 102 from the ridges 104 and 106. The surface 114 of the Holotape 100 opposite the relief pattern 108 is preferably flat and smooth when the Holotape is used in a transmission mode.

Figure 2:
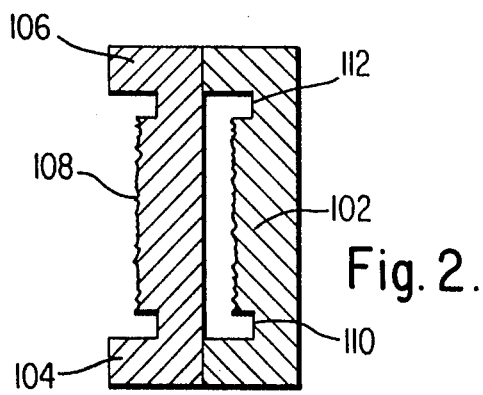
FIG. 2 is a cross-sectional, elevational view showing the contact areas of the tape of FIG. 1 when wound upon itself.

In use, several hundred feet of Holotape may be wound on a reel. When this is done with the novel Holotape replica, shown above, the relief pattern will not come in contact with, rub or abrade the surface adjacent to it on the reel. FIG. 2 shows the contact areas of the Holotape replica of FIG. 1 upon being wound on a reel. It can be seen from FIG. 2 that contact between adjacent loops of tape on the reel are limited to the surfaces of the ridges 104 and 108 in contact with an edge region of the adjacent loop. The hologram relief pattern is free of contact with any solid surface.

Figure 3:
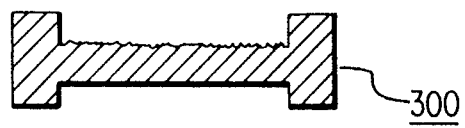
FIGS. 3 and 4 are cross-sectional, elevational views of other embodiments of novel Holotape replicas.
Figure 4:
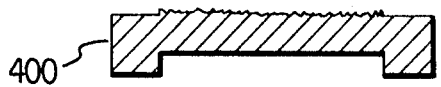

FIGS. 3 and 4 show still other embodiments of Holotape replicas 300 and 400 which will also maintain the relief pattern free from contact with other surfaces when the tape is wound upon itself. However, the embodiment shown in FIG. 1 is preferred since it is relatively simple and also provides protection for the relief pattern even if the Holotape is laid relief pattern face down on a flat surface such as a table or pulled face down across a play back head. In addition the embodiment of FIG. 1 can be made from a metal master having protective ridges.

A typical Holotape replica is about 1 to 6 mils thick measured from the surface of the protective ridges to the surface opposite thereto. The depth of the ridge, that is the distance from the relief pattern to the surface of the ridge in the preferred embodiment of FIG. 1 is typically from 1 micron to 1 mil depending on the thickness of the Holotape. However, the ridge in this embodiment may be any depth provided it extends above the highest peak of the contours of the relief pattern and is not so deep as to make the tape inflexible.

A preferred Holotape replica thermoplastic material is sheet vinyl. It has been found that excellent quality Holotape replicas can be formed in this material by embossing techniques. This vinyl may be laminated to a backing material if desired.

A preferred method of producing a novel Holotape replica is given below. This method additionally provides a Holotape metal master replica which has the same feature of being able to be wound on a reel such that the relief pattern is not in contact with adjacent surfaces on the reel.

Figure 5:
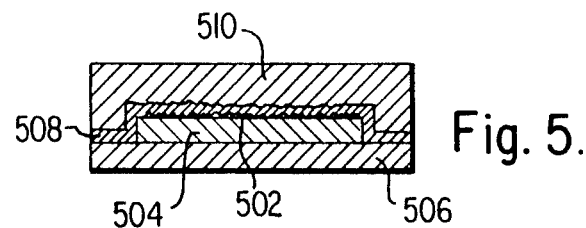
FIGS. 5 and 6 are representative of the sequence of steps in the manufacture of a Holotape replica from a hologram original.
Figure 6:
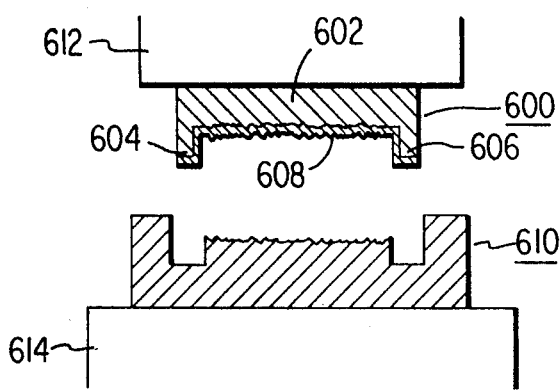
Figure 7:
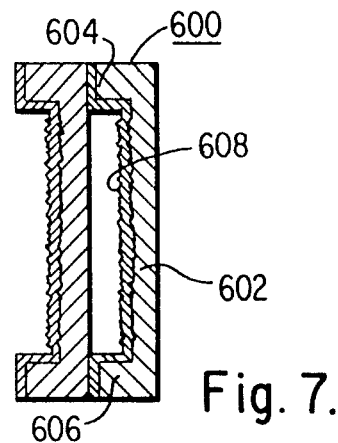
FIG. 7 is a cross-sectional, elevational view of a hologram master as obtained from the novel method when wound on a reel.

The method may be followed with reference to FIGS. 5 to 7. FIG. 5 indicates an original phase hologram relief pattern 502 on the surface of a substrate 504. Generally the relief pattern 502 is comprised of a photoresist material and the substrate is plastic. The substrate 504 is placed upon a backing strip 506 with the surface opposite the relief pattern 502 in contact with the backing strip. The backing strip is wider than the hologram original. The top surfaces of the substrate and the backing strip are then treated as is known in the art so as to activate the surface for electroless nickel plating thereon. The activated surfaces are then plated with electroless nickel 508 which may be followed by electroplating a metal 510 thereon if desired. The plating thickness is generally from about 1 to 4 mils. The plated metal portion is separated from the hologram original and backing strip to provide a flexible nickel hologram master 600 as shown in FIG. 6. The metal master 600 thus formed has a central region 602 of a given thickness and edge regions 604 and 606 of greater thickness providing ridges for protecting the hologram 608 in the central region 602.

The hologram relief pattern of the nickel master is then embossed onto a flexible thermoplastic sheet 610, preferably a cast vinyl, by simultaneously passing the nickel master and the thermoplastic sheet through a pair of calender rollers 612 and 614. The calender roller 612 in contact with the nickel master is heated to a temperature of between about 0.3 to 0.85 times the centigrade flow temperature of the vinyl. The specific temperature depends upon the specific vinyl, the applied pressure and the speed at which the tape is embossed. Generally, temperatures for cast vinyl range from about 50 to 130° C. for pressures of from about 150 to 10 p.s.i. respectively and embossing speeds in the range of 0.2 to 20 inches per second. In addition, the faster the embossing speed the higher the temperature and/or pressure required to obtain optimum results.

The thermoplastic sheet 610 onto which the relief pattern is embossed is wider than the nickel master 600 which is centered with respect to the thermoplastic sheet 610. In this way a thermoplastic hologram replica is formed having the cross-sectional configuration shown in FIGS. 1 and 6.

An advantage of the above method is that it is a single step process whereby the ridges can be formed simultaneously with the replication of the hologram pattern. In addition, not only is the plastic hologram replica formed with edge ridges which protect the hologram relief pattern but in addition the nickel hologram master includes protective edge ridges which enable the master to be stored in a reel or laid on a table without fear of damage to the hologram relief pattern.

The metal Holotape replica, otherwise termed the metal master, can be wound upon itself as shown in FIG. 7.

I claim:

1. A flexible thermoplastic tape having pressed therein a phase hologram relief pattern of at least a two dimensional object, said tape comprising a central region of a first thickness, edge regions of a greater thickness than said central region, a grooved portion between said central region and said edge regions and a phase hologram relief pattern pressed into a surface of said central region.

* * * * *